Aug. 9, 1966 G. N. GOOSSEN ET AL 3,265,818

SIGNAL SYSTEM OPTIMIZATION IN MAGNETIC TAPE APPARATUS FOR PROCESSING CONTINUOUS NONPICTORIAL WIDEBAND SIGNALS

Filed May 28, 1962 2 Sheets-Sheet 1

GEORGE N. GOOSSEN &
SIDNEY S. DAMRON
INVENTORS

BY Nathan N. Kallman

ATTORNEY

GEORGE N. GOOSSEN &
SIDNEY S. DAMRON
INVENTORS
BY Nathan N. Kallman
ATTORNEYS 3,265,818

SIGNAL SYSTEM OPTIMIZATION IN MAGNETIC TAPE APPARATUS FOR PROCESSING CONTINUOUS NONPICTORIAL WIDEBAND SIGNALS

George N. Goossen, Redwood City, and Sidney S. Damron, Los Altos, Calif., assignors to Ampex Corporation, Redwood City, Calif., a corporation of California Filed May 28, 1962, Ser. No. 198,013
2 Claims. (Cl. 179—100.2)

This invention relates to magnetic tape apparatus, and in particular to an improved magnetic recording and playback system for processing continuous transient-free, wideband information having very accurate time stability.

In one type of known magnetic tape apparatus used for magnetic recording and playback of signals over a wide frequency spectrum, a rotary drum assembly carrying a plurality of equally spaced magnetic heads at its periphery may be employed to scan a longitudinally moving magnetic tape transversely for recording a signal or for reproducing the signal information recorded on successive parallel tracks on the tape. Before one head begins to lose contact with the magnetic tape, the succeeding head makes contact so that identical information is recorded on the tape at the end of one transverse track and the beginning of the next transverse track. Switching means is provided during playback of the recorded signal for combining reproduced signal portions to form a substantially continuous output signal. The switching operation is accomplished during the "overlap" period in the reproduce mode; that is, when two successive heads both contact the tape. This type of apparatus has been successfully used for television signal recording and is described in U.S. Patents 2,916,546 and 2,968,692, both issued to C. P. Ginsburg et al., and assigned to the assignee of the instant invention. As is known, standard NTSC television signals include blanking intervals at the end of each horizontal video line and between each vertical field. Therefore, the switching operation is made to occur during such blanking intervals so that none of the video information signal is lost as a result of the switching.

However, there is a strong need for magnetic tape systems that can effectively process continuous wideband or high frequency signals, such as continuous radar or video information, that do not contain built-in blanking or synchronizing signals. The transverse scanning type of magnetic tape apparatus is especially adaptable for processing such high frequency signal information. In copending patent application Serial No. 137,368, filed September 11, 1961, and assigned to the same assignee, there is defined a magnetic tape apparatus that serves to process a continuous wideband signal by transverse scanning means. The continuous signal is recorded and derived for playback through a plurality of heads carried by the rotary scanning means that traverses a magnetic tape. However, when utilizing a plurality of magnetic heads as described, it is generally necessary to employ a separate signal channel for each head to process the portion of the signal that is transduced by such head. With the use of different heads and channels, various problems arise during the record and playback modes.

One of these problems involves the adjustment of the gain setting coupled with the record amplifier driver in each head channel to provide the optimum record current for each magnetic head. In the prior art approach, before making a television picture tape recording, the gain of the record driver for each head channel is varied in steps, while recording a visual image on a tape leader simultaneously with audio frequency signals used for identification of the gain setting. Upon playback of the tape leader, the operator observes a monitoring scope and judges at which steps or gain settings the best picture or image is received. Thereafter, the television signal is recorded on a magnetic tape using the desired settings for each head channel. Although this technique is useful for picture or television recording and reproducing, it is not practical to apply the same subjective tests to a nonpictorial continuous signal, such as radar information, for example.

Other problems arise during playback of a magnetically recorded signal from the differences that may occur in the construction of the magnetic heads, the associated circuitry in each head channel, and other system parameters. For example, there may be variations in the delay characteristics of each head, and the phase and frequency response of each head channel may differ. These notable differences and others combine to modify the amplitude and phase of the frequency modulated information signal that is being reproduced. Furthermore, these amplitude and phase modifications vary as the frequency components of the reproduced signal change, such that a distorted signal output is derived from the demodulator.

However, if the signal output is not a distinct picture or image, the operator of the equipment would find it difficult to evaluate the accuracy of such signal. Therefore, when recording and reproducing nonpictorial signals, an objective reference is required to determine whether the magnetic tape apparatus is operating suitably. For example, the linearity of operation of the modulator in the record mode and of the demodulator during the reproduce mode, should be checked prior to operation of the apparatus. Furthermore, it would be necessary to provide compensation for any errors in the phase and amplitude characteristics of the processed signal that appear as a result of such determinations.

An object of this invention is to provide an improved means for adjusting the gain in each of a plurality of signal channels in a magnetic tape apparatus that processes nonpictorial wideband signals.

Another object of this invention is to provide an improved means for compensation of phase and amplitude distortion in the reproduce channels of such a magnetic tape apparatus.

In accordance with this invention, a prerecording or tape leader is prepared carrying a reference modulated sweep frequency signal. The tape leader is played back prior to the actual recording of the wideband continuous data or information signal through a reproduce system having a novel equalization circuit in each of a plurality of channels. The reproduced sweep signal waveform is observed and adjustments of the equalization circuit are made to provide an optimum readout signal.

The equalization circuit in each channel comprises a resonant circuit wherein the resonant frequency may be varied by means of a variable inductance, and a corrective circuit that adjusts the amplitude and phase response of the signal portion being processed in the channel. Each equalization circuit serves to adjust the signal portion in its respective channel separately and independently so that each signal portion has a proper amplitude and phase in relation to the other signal portions whereby the combined reproduced signal is an accurate representation of the signal that was recorded.

The invention will be described in greater detail with reference to the drawings, in which.

Figure 1:
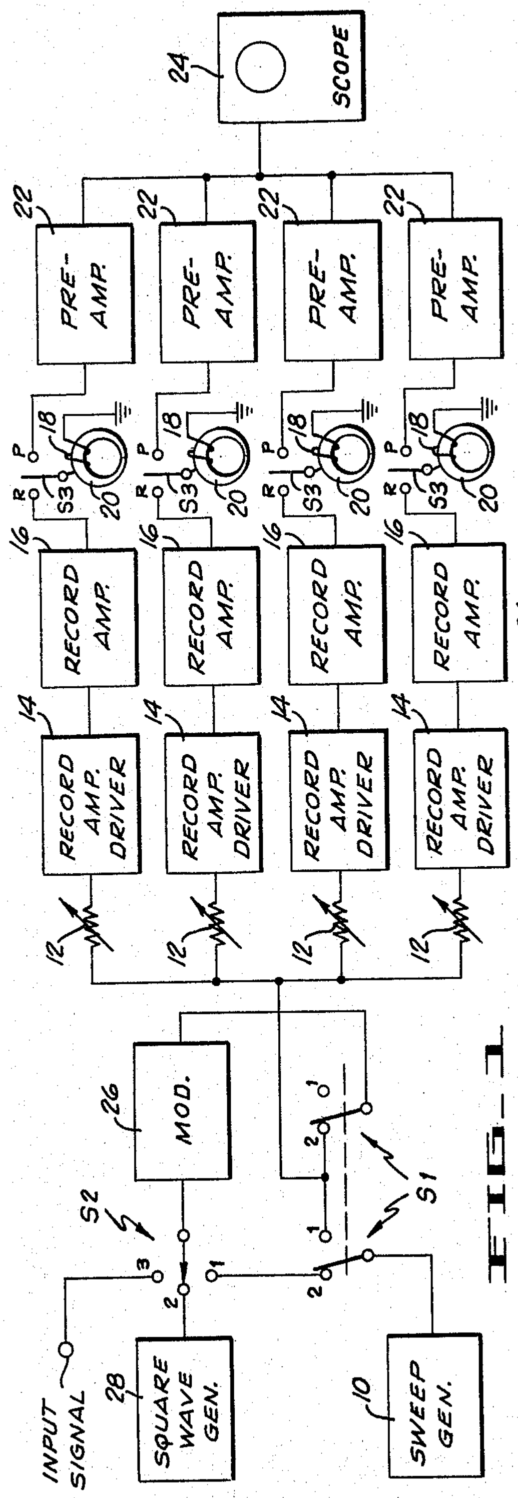
FIGURE 1 is a schematic and block diagram of the inventive magnetic record system, simplified for clarity of illustration.

In FIGURE 1, an embodiment of the invention comprises a sweep signal generator 10 that provides a variable frequency sweep signal, ranging from zero to 10 megacycles per second by way of example, to a plurality of head channels 1–4 through a ganged relay switch S1, when the switch is in Position 1. For simplicity and clarity of explanation, several mechanical and electrical components of the tape apparatus are not shown, such as the capstan that drives the magnetic tape, the tape itself and the tape reels, the rotary head drum that carries the magnetic heads, and associated switching means, among other things. Also, for convenience and clarity, the description that follows will be directed to a single head channel, although the description is applicable similarly to each of the other head channels in the recording and reproducing systems.

Prior to recording the wideband continuous information signal, the variable frequency sweep signal, which produces a complete sweep during each scan of a transducer across the tape is applied through a variable resistance or gain setting 12 to the head channel. The recurring sweep signal is passed through a record amplifier driver 14 and a record amplifier 16, and then is applied through a switch S3 that is in Record (R) position to the electrical circuit or coil 18 associated with the magnetic head 20. The signal is recorded transversely on a magnetic tape (not shown) that traverses the nonmagnetic gap of the rotating magnetic head 20, in a well known manner as described in the aforementioned patents.

As the sweep signal is being recorded, the variable resistor 12 is changed by discrete steps thereby varying the gain or level of record current that appears at the head 20. Simultaneously, an audio signal is recorded to identify each step or gain setting. After recording the sweep signal at the several settings of the resistance or gain adjustment 12, the tape is rewound and replayed so that the magnetically recorded signal is transduced to an electrical signal by the head 20. This transduced signal is directed through the switch S3, that is now in Playback (P) position, to a preamplifier 22 and thence to an oscilloscope 24 that presents a visual indication of the signal output from the preamplifier 22. In this manner, it is possible to observe the particular setting of record current that affords a record/reproduce characteristic encompassing all the frequencies within the radio frequency passband that will be processed by the tape recorder.

With the proper setting of the variable resistor 12 fixed to provide optimum record current, the ganged switch S1 is shifted to Position 2, switch S2 is moved to Position 1, and switch S3 is at the "R" position for the record mode. The variable frequency sweep signal from the generator 10 is thus fed to a modulator 26 wherein the sweep signal is frequency modulated. The frequency modulated (FM) sweep signal is then recorded on a tape leader having spaced markers that are recorded at the edge of the tape to aid in identification of the instantaneous frequency of the varying frequency sweep signal at spaced points.

Figure 2:
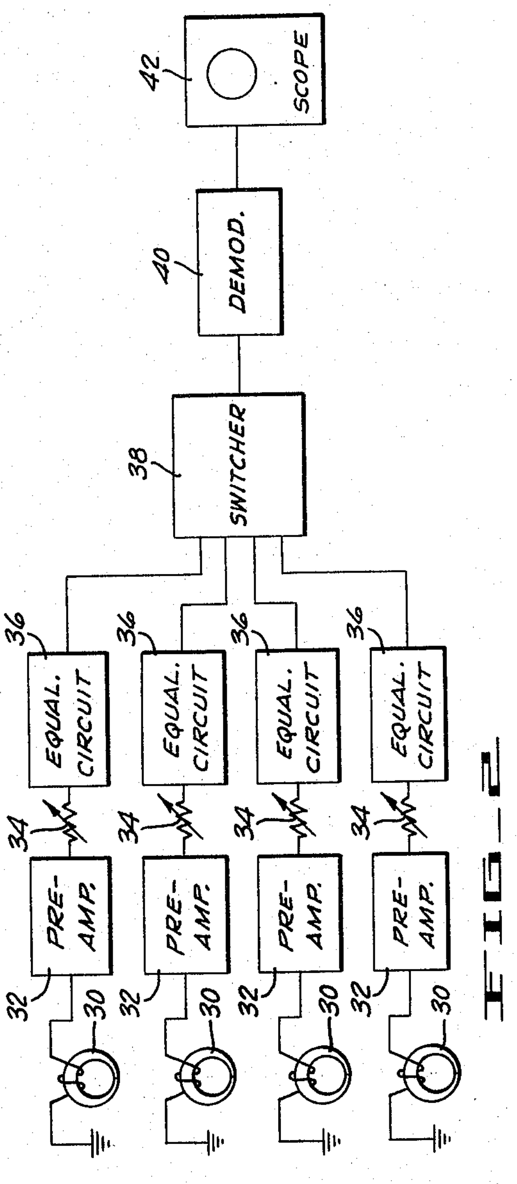
FIGURE 2 is a schematic and block diagram of a playback system compatible with the record system of FIGURE 1, also in simplified form.

The tape leader having the FM sweep signal is used in the reproduce system of a magnetic tape apparatus, such as shown in abbreviated form in FIGURE 2, that incorporates the equalization circuit of this invention. During the reproduce mode, the FM sweep signal that has been recorded is transduced by the rotary heads 30, and the transduced signal portions derived from the scanned transverse tracks on the tape are channeled through preamplifiers 32 and gain adjustments 34 to equalization circuits 36. Each equalization circuit 36 (described hereafter with reference to FIGURE 3) has adjustable electrical parameters that may be utilized for compensation of the head circuit self-resonance, and serves to provide symmetry and linearity of frequency response in each of the separate channels.

The signal portions are received from each equalization circuit 36 by a switcher 38 that combines the signal portions sequentially into a continuous signal. The continuous FM sweep signal is then demodulated by a demodulator 40 and the modulated signal is displayed on an oscilloscope 42.

If the observed waveform has an envelope that has a sloping amplitude versus frequency response as shown in FIGURES 4(A) and 4(B), a variable capacitance 50 and variable resistance 80 (see FIGURE 3) are adjusted in the equalization circuit 36 for correction. If the waveform envelope appears as shown in FIGURES 4(C) and 4(D), then an inductance 78 is varied to produce an envelope that is symmetrical about its axis. After suitable adjustment, the desired linear waveform, FIGURE 4(E), is obtained indicating that the head circuit Q and resonance in the adjusted channel has been compensated. In this fashion, each channel may be separately and independently adjusted to provide proper amplitude and phase response.

As an additional test for phase and transient response in each channel, a frequency modulated square waveform that is derived from a signal generator 28 coupled to the record system (FIGURE 1) is recorded and reproduced prior to the recording of the information signal. The square wave is directed through switch S2 in Position 2 to the modulator 26 that provides an FM square wave output. The FM square wave is passed through switch S1 in Position 2 to the plurality of recording channels, and is recorded on the tape. The recorded square wave is demodulated, reproduced and displayed by the reproduce system to determine whether the output square wave is properly formed, as shown in FIGURE 4(F). If the output square wave has any overshoots or spurious spikes, as seen in FIGURE 4(G), indicating improper transient response, the equalization circuit of FIGURE 3 may be employed to provide a corrected waveform with accurate phasing and transient response in each channel.

Figure 3:
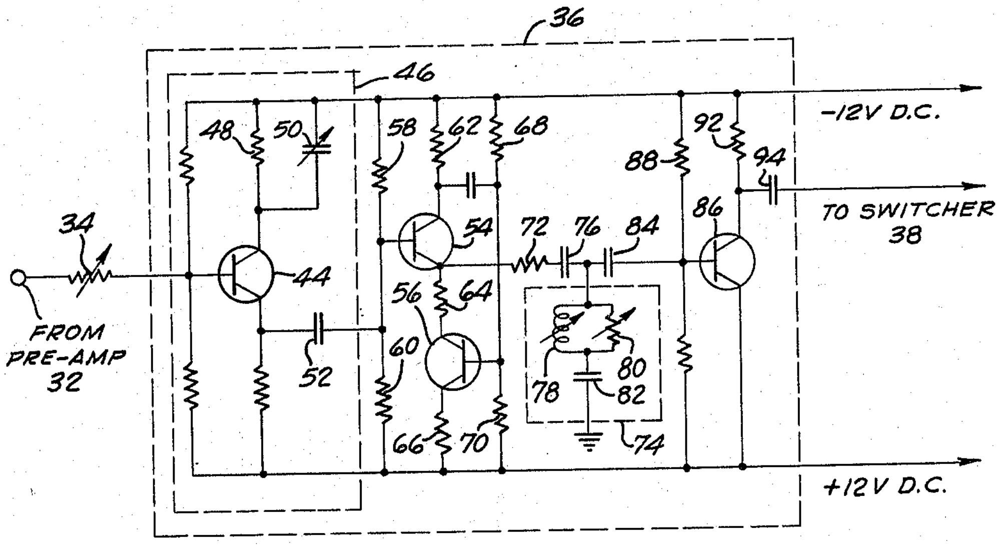
FIGURE 3 is a schematic circuit diagram of an equalization circuit such as utilized with the reproduce system depicted in FIGURE 2.
Figure 4:
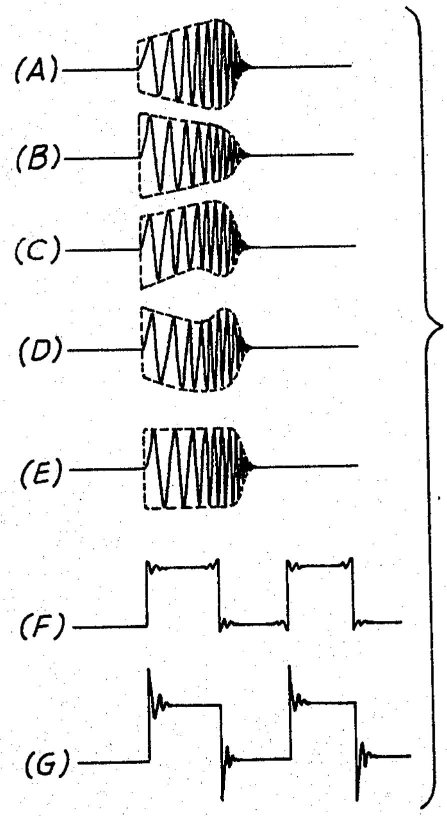
FIGURES 4(A)–(G) are a series of waveforms that may be modified by the equalization circuit of FIGURE 3.

In FIGURE 3, an embodiment of an equalization circuit that compensates for phase nonlinearity and amplitude distortion caused by head resonance and other factors is shown.

It is known that the head circuit is generally a tuned LCR circuit. Thus compensation for phase and amplitude distortion may be achieved by including in each radio frequency signal reproduce channel a compensating network that has phase and amplitude response complementary to the phase and amplitude response of the reproduce head circuit. This compensating network is an LCR circuit having variable Q and resonant frequency.

In FIGURE 3, the uncompensated reference modulated sweep signal is received from the preamplifier 32 through the gain control 34 and directed to a corrective variable RC phase lead network 43. (As an alternative, an LR or LCR phase lead network may be used.) The signal is applied to the base of a transistor 44 that is a conventional amplifier stage with variable emitter peaking. A time constant network 46 that is coupled to the emitter of the transistor 44 comprises a resistor 48 and a variable capacitor 50. The time constant of this network may be varied by adjusting the variable capacitor 50 so that the correct amplitude response tilt and proper phase correction may be obtained, as described with reference to FIGURES 2 and 4.

The amplified signal that has been partially compensated for by the time constant network 46 is fed from the collector of the transistor 44 through a coupling capacitor 52 to the base of a transistor 54. The transistor 54 is part of a conventional totem pole isolation stage that also includes a transistor 56 and resistors 58, 60, 62, 64, 66, 68 and 70. This isolation stage has a high input impedance and a low output impedance. A resistor 72 that is coupled between the emitter of the transistor 54 and a resonant circuit 74, which serves to adjust the amplitude and phase of the processed signal, increases the output impedance to provide proper isolation between the ungrounded side of the resonant circuit 74 and a point of reference potential, such as ground. A capacitor 76 serves as a D.C. blocking and coupling capacitor to couple the processed reference signal to the amplitude and phase correction resonant network 74.

The resonant network 74 comprises a variable inductance 78, variable resistor 80, and fixed capacitor 82 that provide additional compensation for the amplitude response and phasing of the processed signal. The output signal that is derived from the compensation network 74 is then passed through a capacitor 84, which is a D.C. blocking and coupling capacitor, to the base of a transistor 86. The transistor 86 together with biasing resistors 88 and 90 and emitter resistor 92 comprise a conventional emitter follower stage. The output signal is derived from the emitter follower through a capacitor 94 and is then directed to the switcher 38.

The variable capacitor 46 and variable resistor 80 may be adjusted to compensate for overpeaking or underpeaking that may be observed when displaying the reproduced FM sweep signal employed as a reference on the tape leader. The variable inductance 78 in conjunction with the capacitor 82 and resistor 80 is utilized to compensate for the self-resonance and Q of the magnetic head 20. Each channel may be adjusted separately and independently by use of these variable electrical components. These adjustments may be made during the replay of the tape leader just prior to playback of the recorded information signal on any magnetic tape reproducing apparatus that incorporates the equalization circuit of this invention.

There has been described herein an improved method and means for adjustment and alignment of the electrical parameters of a plurality of channels in a magnetic tape recording and reproducing system that processes a continuous wideband signal. Thus, the wideband signal is recorded on a magnetic medium with better quality, and in view of the equalization of the reproduce channels, an accurate representation of the recorded signal is obtained.

What is claimed is:

1. In a magnetic tape apparatus that processes a continuous wideband signal by recording transverse tracks of information on a longitudinally moving magnetic tape, such apparatus having a plurality of signal record and reproduce channels that process different portions of the continuous signal in a predetermined sequence, the combination comprising:

means for adjusting the gain of each signal channel separately and independently;

means for recording a frequency modulated sweep signal;

means for reproducing and displaying such sweep signal;

an equalization circuit having adjustable means for varying the resonant frequency characteristic in each of the signal reproduce channels;

means for recording a frequency modulated square waveform;

means for demodulating and reproducing such square waveform; and means for further adjusting the equalization circuit to provide an accurate amplitude and phase of the signal portion in each reproduce channel relative to the signal portions in the other channels.

2. In a magnetic tape apparatus signal system for processing a continuous nonpictorial wideband signal by recording transverse tracks of information on a longitudinally moving tape, the combination comprising a plurality of signal record channels respectively having magnetic heads for recording on said tape in a predetermined sequence different portions of a continuous signal applied to the channels, said channels respectively having gain controls, said channels having a common input, a variable frequency sweep generator for generating a sweep signal continuously varying in frequency between predetermined limits corresponding to the bandwidth of an inforamtion signal to be processed, a frequency modulator, an information signal input terminal, switch means coupled to said sweep generator, said modulator, said information signal input terminal, and said common input of said channels for selectively coupling said sweep generator directly to said common input to effect recording of sweep frequency signals on said tape at different settings of said gain controls as a basis for selection of optimum record current, coupling said sweep generator through said modulator to said common input to effect recording of frequency modulated sweep frequency signals on said tape as a basis for adjustment of phase and amplitude response, or coupling said information signal input terminal through said modulator to said common input to effect recording of an information signal on said tape, reproducing and displaying means, means for selectively coupling said reproducing and displaying means to said heads to provide a visual display of the direct recorded sweep frequency signals from which adjustments of said gain controls for optimum record currents in said channels can be ascertained, a plurality of signal reproduce channels each including a magnetic head, a gain control and equalization circuit, a switcher coupled to said reproduce channels for combining equalized signal portions therein, a demodulator coupled to said switcher for detecting the combined signal therefrom, and means coupled to the demodulator for displaying the detected signal whereby display of the detected frequency modulated sweep frequency signals provides a visual indication of adjustment of said equalization circuits for optimum resonance and amplitude and phase response.

References Cited by the Examiner

UNITED STATES PATENTS

| | | | |
|---|---|---|---|
| 2,106,350 | 1/1938 | Hickman et al. | 179—100.2 |
| 2,791,640 | 5/1957 | Wolfe | 179—100.2 |
| 3,029,317 | 4/1962 | Davidson | 179—100.2 |
| 3,031,525 | 4/1962 | Oniki | 178—6.6 |
| 3,068,327 | 12/1962 | Davidson | 179—100.2 |

OTHER REFERENCES

Bernstein: Video Tape Recording, published by John F. Rider, Inc., New York, July 1960, pp. 87–89 and 151–152.

Tape Recorders—How They Work: Westcott and Dubbe, publ. Howard W. Sams & Co., Inc., Indianapolis, Ind., pp. 165–167, 1956.

The Audio Cyclopedia (1st ed.): Tremaine, Howard W. Sams & Co., Inc., Indianapolis, Ind., pp. 495 and 881, 1959.

BERNARD KONICK, *Primary Examiner.*